Sept. 16, 1952 — E. A. FARR — 2,610,572
COOKING APPLIANCE
Filed July 22, 1949
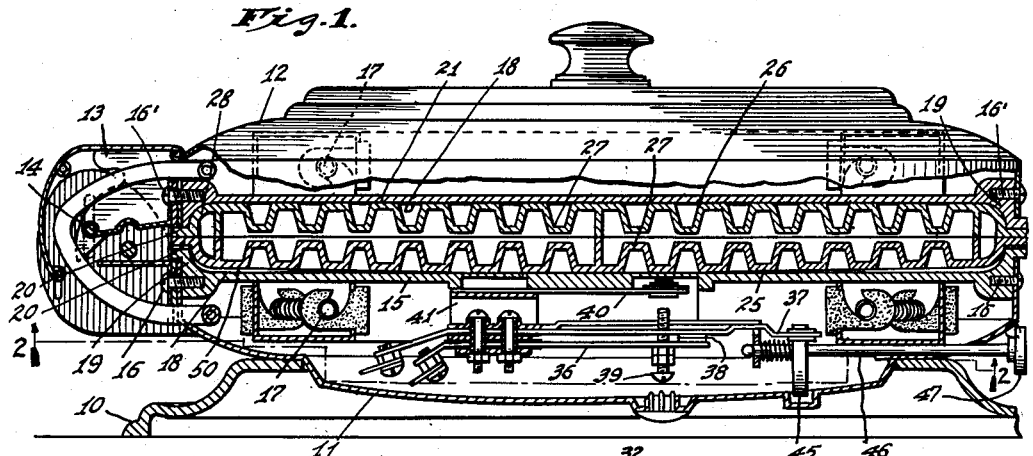
INVENTOR.
EDWARD A. FARR,
BY
ATTORNEYS.

Patented Sept. 16, 1952

2,610,572

UNITED STATES PATENT OFFICE 2,610,572

COOKING APPLIANCE

Edward A. Farr, Columbus, Ind., assignor to Arvin Industries, Inc., a corporation of Indiana Application July 22, 1949, Serial No. 106,274

2 Claims. (Cl. 99—331)

This application is a continuation-in-part of my prior applications, Serial No. 681,406, filed July 3, 1946, and Serial No. 51,333, filed September 27, 1948, both now abandoned, and relates to a cooking appliance suitable for use at the table and capable of providing, at the option of the user, either plane cooking surfaces, for the cooking of griddle cakes, meats, etc., or a waffle-grid, for the cooking of waffles. It has heretofore been proposed to produce a cooking appliance of this kind by employing interchangeable waffle grids and plane plates, either of which can be mounted in an appropriate casing or supporting frame. Such prior structures, however, have been open to the objection that either two sets of heating elements, for the waffle grids and plane plates respectively, have been necessary, or, if a single set of heating elements permanently mounted in the supporting casing or frame is employed, heat transmission from the heating element to the cooking surface is inefficient.

It is the object of my invention to produce a cooking appliance of the type indicated in which a single heating element or set of heating elements may be used efficiently to heat either waffle grids or plane cooking plates. Another object of my invention is to produce a cooking appliance which can readily be converted from a waffle-baker to a plane grill, and vice versa. A further object of my invention is to embody in the cooking appliance an automatic control means which will be effective irrespective of whether the device is used as a waffle-baker or as a plane grill. Still another object of my invention is to produce a convertible cooking appliance which can be simply and economically manufactured.

In carrying out my invention in its preferred form I employ a suitable casing or support desirably comprising a base and cover connected therewith through an expansible hinge. Mounted in opposed relation in the base and cover I provide a pair of plane grills each of which has an electrical resistance heating element directly associated with it. One of the grills, conveniently the lower one, has associated with it a temperature-responsive element responsive to the temperature of the grill and operative to control the connection of the heating elements to a source of electric current. For association with each of such grills I provide a waffle grid one surface of which is formed to provide a suitable waffle mold and the opposite surface of which is formed to fit in close association with the associated grill in the neighborhood of the temperature-responsive element. Latch means carried either by the grill or the waffle grid engageable with the other of such two elements serve to hold each grid in association with the grill.

The accompanying drawing illustrates my invention:

Fig. 1 is a side elevation in partial section of a cooking appliance showing the waffle grids in place in association with the plane grill; Fig. 2 is a horizontal section generally on the line of 2—2 of Fig. 1; and Fig. 3 is a fragmental vertical section on the line 3—3 of Fig. 2.

The device illustrated in the drawing comprises a base 10, a lower housing 11, an upper housing 12, and an extensible hinge 13 interconnecting the housing 11 and 12 for relative swinging movement about the axis of a hinge pin 14 while permitting relative vertical movement of the two housings. The particular hinge illustrated in the drawing forms the subject of my prior Patent No. 2,478,529 granted August 9, 1949.

Mounted in the lower housing 11 is a lower grill 15 secured in place in the open upper end of the housing as by means of screws 16. Conveniently, the grill 15 is in the form of a casting of aluminum or other metal of light weight and high heat-conductivity, and has an associated electrical resistance heating element 17 mounted in any convenient fashion in heat-transferring relationship with it. The grill has a substantially plane cooking surface 18 desirably surrounded by a peripheral rim 19. A flange 20, projecting outwardly from the rim 19 overlies the upper edge of the housing 11.

An upper grill 21 generally similar to the lower grill 15 but inverted in position is secured within the upper housing 12, as by screws 16', in opposed relation to the grill 15. The grill 21 has an associated heating element 17, a cooking surface 18, a rim 19, and a flange 20 all similar to the corresponding features of the lower grill.

The device as so far described is not new. It may be used in the position illustrated in Fig. 1 for the broiling of meats or other cooking operations in which the food to be cooked is confined between the upper and lower grills 15 and 21 and cooked simultaneously on both sides by heat derived from the heating elements 17. The expansible hinge 13 permits considerable variation in the thickness of the food cooked in this manner. If desired, the upper housing 12 may be swung through 180° about the axis of the hinge pin 14, in which condition the device provides two upwardly presented cooking surfaces each surrounded by a peripheral rim 19.

For the purpose of converting the cooking appliance as so far described into a waffle iron I provide a pair of waffle-grids 25 and 26, desirably formed of some relatively light metal possessing high heat-conductivity, such as aluminum, or aluminum alloy. Each of the waffle grids 25 and 26 embodies a plurality of projecting elements 27 such as are characteristic of waffle grids. In addition, each grid is provided with a peripheral rim 28 adapted to confine the waffle-batter. The rear face of each of the grids 25 and 26 is shaped to fit against the cooking surface 18 of the associated grill and to have a considerable area of close contact therewith whereby effective heat-transmission from the grill to the grid will occur.

For the purpose of holding the grids 25 and 26 in contact with their associated grills, I may employ retaining devices of the type illustrated in Fig. 3. Such retaining mechanism comprises an ear 30 secured to the grid 25 as by means of a screw 31 so that it projects outwardly beyond the margin of the grid 25 where there is pivotally connected to it a rotatable clamp finger 32. Conveniently, the pivotal connection of the ear 30 with the finger 32 is effected through the medium of a pivot pin 33. The finger 32 has an inwardly projecting cam portion 34 shaped to engage beneath the flange 20 on the grill 15. Desirably, the connection between the ear 30 and the finger 32 embodies a spring 35 which surrounds the pin 33 and urges the finger upwardly with respect to the ear, thus exerting a constant effort holding the waffle grid 25 resiliently in contact with the grill 15. Similar retaining devices may be employed to retain the upper waffle grid 26 in association with the upper grill 21. The retaining device illustrated constitutes the subject-matter of United States Letters Patent No. 2,496,705, granted February 7, 1950, on the application of John P. Theisen and myself.

Desirably, the heating elements 17 associated with the upper and lower grills are automatically controlled. The control means illustrated in the drawing comprises a switch embodying two leaf springs 36 and 37 rigidly mounted in insulated relation at one end and provided with contacts 38 engageable and disengageable by flexing of one or the other of the springs. The lower spring 36 supports an adjusting screw 39 which projects upwardly through the plane of the upper spring 37 for co-operation with the free end of a bi-metallic strip 40 responsive to the temperature of the lower grill 15. Conveniently, the fixed ends of the springs 36 and 37 are mounted on a bracket 41 which is secured to the lower face of the grill 15 as by screws 42. The fixed end of the bi-metallic strip 40 is disposed between the bracket 41 and the lower surface of the grill 15 so that when the screws 42 are tightened, the bi-metallic strip will be forced into close heat-transmitting relationship with such grill. The bi-metallic strip 40 is arranged so that its free end will move downwardly upon an increase in temperature, engage the end of the screw 39, and bend the lower spring 36 to separate the contacts 38. It will be understood, of course, that the heating elements 17 are adapted for connection to a suitable source of electric current in series with the switch 36—37, so that when the lower spring 36 is forced downwardly by the bi-metallic strip 40 to separate the contacts 38 the supply of current to the heating elements 17 will be interrupted.

For the purpose of readily adjusting the control means to vary the temperature at which the contacts 38 are separated and heating elements de-energized, the upper spring 37 may continue beyond the contacts 38 for co-operation with a cam 45 which can be rotated to raise or lower the free end of the spring 37 and the contact 38 carried thereby. Conveniently, the cam 45 is rigidly mounted on a shaft 46 having its inner end rotatably supported from the bracket 41 and its outer end extending outwardly through the casing where it is provided with an adjusting knob 47 by which it may be rotated.

From the construction described, it will be seen that a cooking appliance embodying my invention may be used, without the grids in place, to provide a pair of opposed or upwardly presented, plane cooking surfaces heated by the associated heating elements 17. With the grids in place, the device is adapted for the cooking of waffles. Heating for the baking of waffles is derived from the same heating elements 17 as are used when the device is being employed as a grill; and the close contact between the grid and grill maintained over a considerable area by the retainers 32 provides for effective heat-transmission from grill to grid. The intimate contact between the lower waffle grid 20 and the lower grill 15 also makes it possible to employ the temperature-responsive switch mechanism to control the duration of a waffle-baking interval. In baking waffles, the grids 20 and 21 must be preheated. When the batter is applied to the grids their temperature drops; and because of the close contact between the lower grill 15 and the lower grid 20, the temperature of the lower grill likewise drops to cause the free end of the bi-metallic strip 40 to move upwardly and close the switch 36—37 if such switch is not already closed. The resultant energization of the heating element 17 supplies heat which is transmitted through the grills to the grids to cook the waffle. As is known, the browning of the waffle as its cooking nears completion is a function of the temperature of the grids in contact with it. Because of the close contact between the lower grid 20 and the lower grill 15, the temperature of the latter follows closely the temperature of the former; and as the bi-metallic strip is in close heat-conducting relationship with the grill 15 it may be employed, through its co-operation with the switch 36—37, to terminate the cooking operation. Adjustment of the cam 45 determines the color which the waffle attains at the completion of the cooking operation. For waffles light in color, the cam 45 is rotated through the shaft 46 and knob 47 to raise the free end of the spring 37, thus lowering the temperature at which the bi-metallic strip operates to separate the contacts 38. Contrariwise, rotating the cam 45 to lower the free end of the strip 37 will increase the temperature at which the contacts 38 are separated and will hence result in waffles of darker color.

As indicated above, it is desirable that each waffle grid fit closely over a considerable area against its associated grill in order that heat may be transmitted effectively from the grills to the grids. For accurate automatic control of waffle-browning I have found it essential that the area over which the lower grill 15 and grid 25 are in contact include the neighborhood of the temperature-responsive element 40. Because of warping of the grid and grill as the result of temperature changes during their initial machining and during cooking operations, as well as for other reasons, it is difficult to produce a grid and grill which will engage each other closely over the entire extent of their opposed surfaces. Accordingly, in order to insure the necessary close engagement in the neighborhood of the temperature-responsive element, I find it advisable to relieve one or the other of the opposed surfaces of the grid 25 and the grill 15 over those portions relatively remote from the vicinity of the temperature-responsive element 40.

In the construction shown, where the temperature-responsive element 40 is mounted near the center of the grill 15, the peripheral portions of one of the opposing surfaces of the grill and grid are relieved, as indicated exaggeratedly at 50 in Fig. 1. Conveniently, the relief is provided on the waffle grid 25 and gradually increases from the center portion of the lower surface of such grid to the outer edges thereof. In practice, it has been found that a relief of the order of 0.015 inch at the periphery of a grid whose horizontal dimensions are approximately 10 inches will prove adequate for my purpose.

The expedient of providing relief between the opposed surfaces of the grid and grill except in the vicinity of the temperature-responsive element 40 not only makes accurate machining unnecessary but also accommodates for any warping of the grid and grill due to temperature changes.

I claim as my invention:

1. In a cooking appliance, a grill having a substantially plane cooking face, an electric heating element for heating the grill, a waffle grid having a face opposed to and adapted for application to the cooking face of the grid to receive heat conducted therethrough from the heating element, a temperature-responsive element in close heat-transmitting relation with the grill at a predetermined point on the opposite side thereof from the cooking face, one of the opposed faces of the grill and grid being relieved over portions remote from such predetermined point to provide over such remote portions a slight space between said opposed faces and to leave an unrelieved surface-portion occupying only a small fraction of the entire area of such surface, releasable means for holding the grid in place on the grill and in close heat-transmitting relationship therewith in the immediate vicinity of said temperature-responsive element, and switch means operated by the temperature-responsive element for controlling the supply of current to said heating element.

2. The invention set forth in claim 1 with the addition that said temperature-responsive element is located near the center of the grill, one of the opposed faces of the grill and grid being relieved over its peripheral portion.

EDWARD A. FARR.

REFERENCES CITED

The following references are of record in the file of this patent:

UNITED STATES PATENTS

| Number | Name | Date |
| --- | --- | --- |
| 144,151 | Smith | Oct. 28, 1873 |
| 1,405,043 | Krusheld | Jan. 31, 1922 |
| 1,450,277 | Brown et al. | Apr. 3, 1923 |
| 1,900,619 | Snyder | Mar. 7, 1933 |
| 1,971,971 | Walder | Aug. 28, 1934 |
| 2,102,879 | Benson | Dec. 21, 1937 |
| 2,213,728 | Allenby | Sept. 3, 1940 |
| 2,267,387 | Winborne | Dec. 23, 1941 |
| 2,282,089 | Propernick | May 5, 1942 |
| 2,361,285 | Gough | Oct. 24, 1944 |

FOREIGN PATENTS

| Number | Country | Date |
| --- | --- | --- |
| 224,904 | Great Britain | June 11, 1925 |